(12) United States Patent
Nanba

(10) Patent No.: US 6,297,870 B1
(45) Date of Patent: Oct. 2, 2001

(54) PHOTOGRAPHING APPARATUS, METHOD FOR RECORDING AN IMAGE BY THE PHOTOGRAPHING APPARATUS, AND METHOD FOR REPRODUCING AN IMAGE BY THE PHOTOGRAPHING APPARATUS

(75) Inventor: Katsuyuki Nanba, Sakai (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/291,478

(22) Filed: Apr. 14, 1999

(30) Foreign Application Priority Data

Apr. 20, 1998 (JP) .................................. 10-109566

(51) Int. Cl.$^7$ .......................... G03B 27/00; G03B 27/52; G03B 27/32; H04N 5/76
(52) U.S. Cl. ................... 355/18; 355/40; 355/77; 348/231
(58) Field of Search ................... 355/40, 18, 29, 355/72; 340/146.2; 365/127; 386/30, 42, 128, 130, 46; 396/322, 549; 348/207, 231, 233, 372

(56) References Cited

U.S. PATENT DOCUMENTS

| | | | | |
|---|---|---|---|---|
| 4,723,138 | * | 2/1988 | Hashimoto et al. | 346/160 |
| 5,155,341 | * | 10/1992 | Ohtani et al. | 235/375 |
| 5,237,156 | * | 8/1993 | Konishi et al. | 235/375 |
| 5,434,618 | * | 7/1995 | Hayashi et al. | 348/231 |
| 5,477,264 | | 12/1995 | Sarbadhikari et al. | 348/231 |
| 5,479,206 | | 12/1995 | Ueno et al. | 348/211 |
| 5,481,303 | * | 1/1996 | Uehara | 348/231 |
| 5,525,957 | * | 6/1996 | Tanaka | 348/220 |
| 5,528,293 | * | 6/1996 | Watanabe | 348/231 |
| 5,532,740 | * | 7/1996 | Wakui | 348/231 |
| 5,760,916 | * | 6/1998 | Dellert et al. | 358/408 |
| 5,793,517 | * | 8/1998 | Aizawa et al. | 358/468 |
| 5,822,145 | * | 10/1998 | Nishida et al. | 360/69 |
| 5,838,363 | * | 11/1998 | Saito | 348/96 |
| 5,886,957 | * | 3/1999 | Yokota et al. | 369/13 |
| 5,926,256 | * | 7/1999 | Yahara | 355/64 |
| 5,986,700 | * | 11/1999 | Wakui | 348/231 |

* cited by examiner

Primary Examiner—Russell Adams
Assistant Examiner—Hung Henry Nguyen
(74) Attorney, Agent, or Firm—Burns, Doane, Swecker & Mathis, LLP

(57) ABSTRACT

A photographing apparatus can transfer an image to an image processing apparatus with a first recording medium. The photographing apparatus includes a discriminator which determines a state of a second recording medium for recording a photographed image, the recording medium being detachably provided to the photographing apparatus. The photographing apparatus also includes a selector which selects whether the photographed image is to be transferred to the first recording medium or to the second recording medium, based on the determined state by the discriminator, and a controller which controls a transfer of the photographed image to the recording medium selected by the selector.

14 Claims, 9 Drawing Sheets

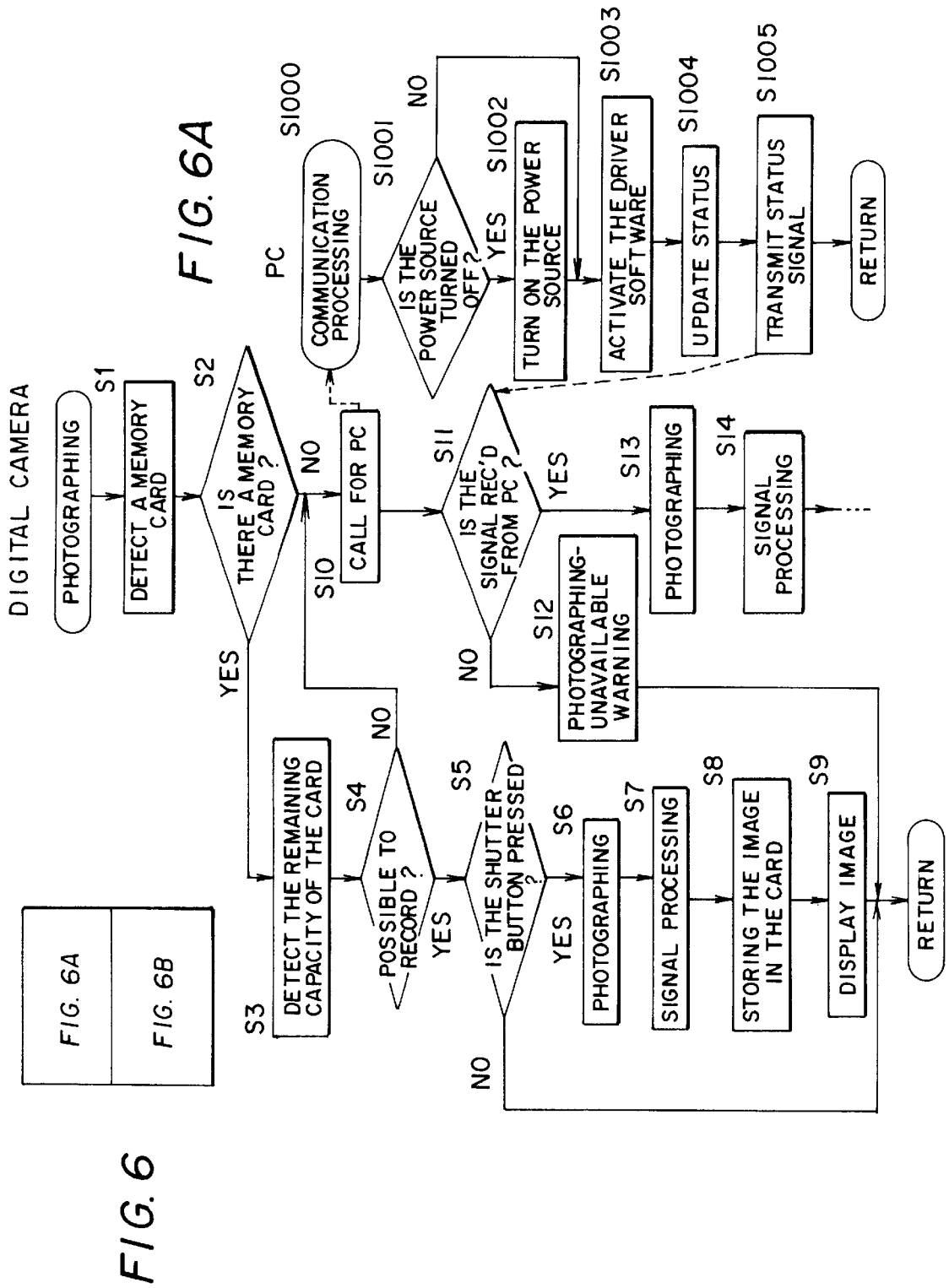

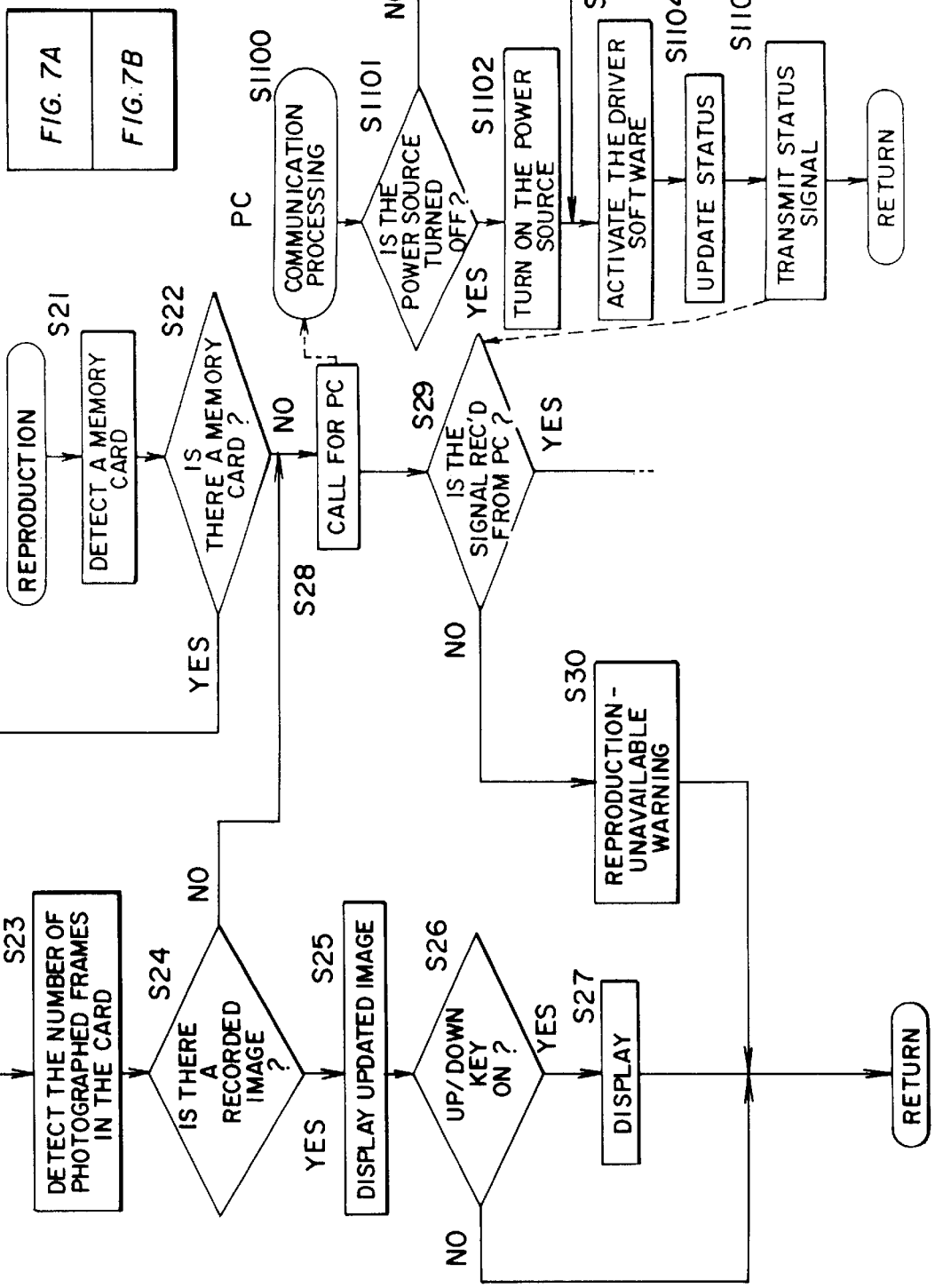

PHOTOGRAPHING APPARATUS, METHOD FOR RECORDING AN IMAGE BY THE PHOTOGRAPHING APPARATUS, AND METHOD FOR REPRODUCING AN IMAGE BY THE PHOTOGRAPHING APPARATUS

The present invention claims priority based on Japanese Patent Application Serial No. H10-109566, the contents of which are incorporated hereinto by reference in its entirety.

BACKGROUND OF THE INVENTION

1. Field of the Invention

This invention relates to a photographing apparatus such as a digital camera, which photoelectrically converts an optical image of an object into an image signal, preforms image processing if necessary, and records the image signal in a recording medium. This invention also relates to a method for recording an image by the photographing apparatus, and a method for reproducing the image by the photographing apparatus.

2. Description of the Related Art

As a recording medium for use in a digital camera, not only a memory built in the digital camera but also a memory card detachably installed in the digital camera, have been known. By using the memory card, a user can consecutively photograph by replacing the memory cards, and the image data can be stored in these memory cards.

However, the capacity of such a normal memory card is about 2M or 8M, therefore, the number of the flames recordable in each memory card is limited to only 40 to 160. Thus, in order to store these images, it is required to transfer these image data to a recording medium having a large recording capacity, such as an optical magnetic disk, a CD-R or a hard disk. In this case, the recording medium can store images approximately 100 times as compared to a normal memory card, though it depends on which recording medium having a large capacity is used.

Under such circumstances, a digital camera system, in which a digital camera is connected to a personal computer (PC) having a large capacity recording medium so that the image data photographed by the digital camera is transferred to the large capacity recording medium by a driver software of the PC side, has been provided.

However, in a conventional digital camera system, in a case where the digital camera is once connected to the PC, even if a recording medium such as a memory card is installed in the digital camera and the recording medium can record a photographed image, the image data photographed by the digital camera is recorded in a recording medium in the PC side. Thus, in a case where the digital camera is frequently connected to or disconnected from the PC, some of the image data are recorded in the digital camera side, and the other thereof are recorded in the recording medium of the PC side. This causes troublesome management of the recorded images.

Furthermore, in order to transfer the image data from the digital camera to the PC or to record the image data in a recording medium of the PC side, it is required to follow a troublesome procedures including appropriately physically connecting the digital camera to the PC and then activating the driver software of the PC, resulting in a poor operability.

SUMMARY OF THE INVENTION

Therefore, it is an object of the present invention to provide a photographing apparatus such as a digital camera which can easily manage photographed images by the photographing apparatus and is superior in a recording operability of the photographed images to a recording medium of an image processing apparatus such as a computer.

It is another object of the present invention to provide a method for recording an image by the photographing apparatus.

It is still another object of the present invention to provide a method for reproducing an image by the photographing apparatus.

It is yet another object of the present invention to provide a program product detachably installed in the photographing apparatus.

In order to achieve these objects, in one aspect of the present invention, a photographing apparatus which is able to transfer an image to an image processing apparatus with a first recording medium, the photographing apparatus, comprising:

a discriminator which judges a state of a second recording medium for recording a photographed image, the recording medium being detachably installed in the photographing apparatus;

a selector which selects whether the photographed image is to be transferred to the first recording medium or to the second recording medium, based on the judged result of the discriminator; and a controller which controls a transfer of the photographed image to the recording medium selected by the selector.

With this photographing apparatus, it is judged whether the photographed image is to be transferred to the first recording medium or to the second recording medium. In other words, depending on the state of the second recording medium of the photographing apparatus side, the recording destination of the photographed image is controlled. This enables an easy management of the photographed images.

The state of the second recording medium judged by the discriminator is whether or not the second recording medium is installed in the photographing apparatus, for example. Thus, the selector selects the first recording medium when the second recording medium is not installed in the photographing apparatus.

The discriminator judges a recordable capacity of the second recording medium, and the selector selects the first recording medium when the second recording medium is not installed in the photographing apparatus.

DESCRIPTION OF THE DRAWINGS

The above and other objects, features, and advantages of the present invention will be apparent from the following detailed description of the preferred embodiments with reference to the attached drawings, wherein.

DETAILED DESCRIPTION OF THE PREFERRED EMBODIMENTS

Figure 1:
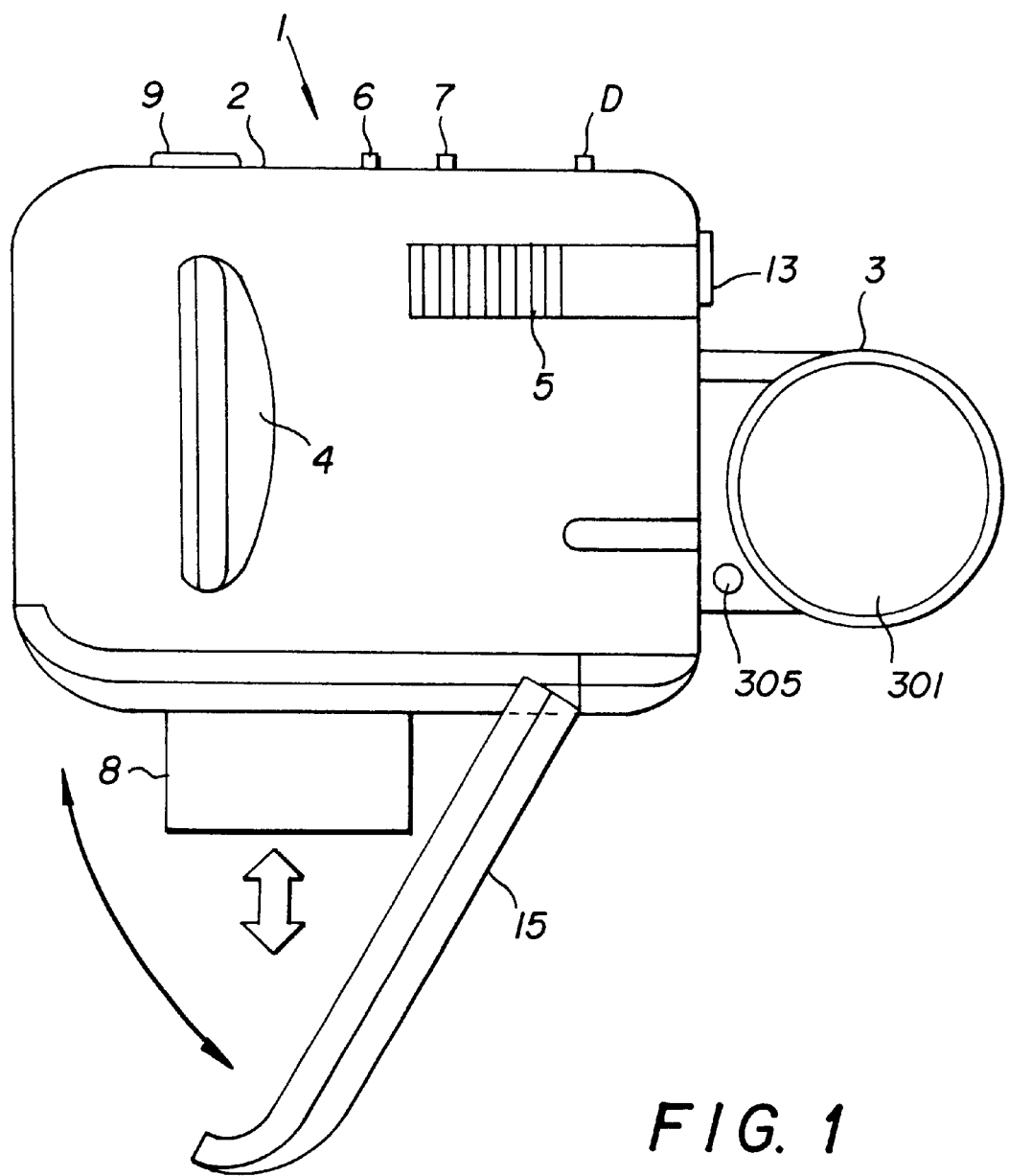
FIG. 1 is a front view of a digital camera used in an image processing system according to one embodiment of the present invention.
Figure 2:
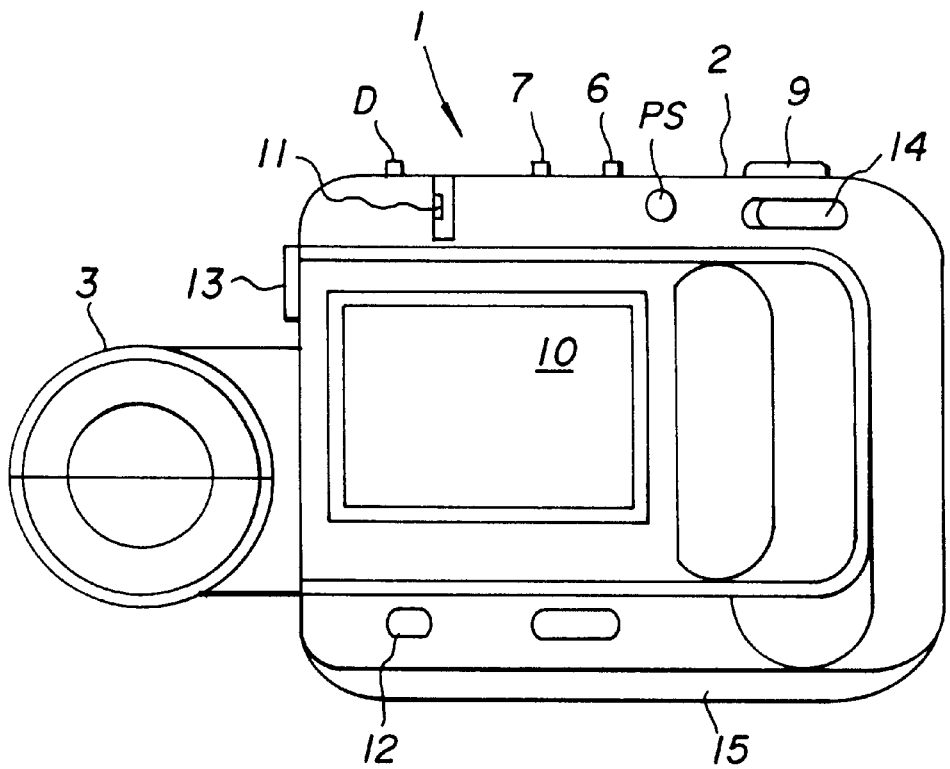
FIG. 2 is a rear view of the digital camera.
Figure 3:
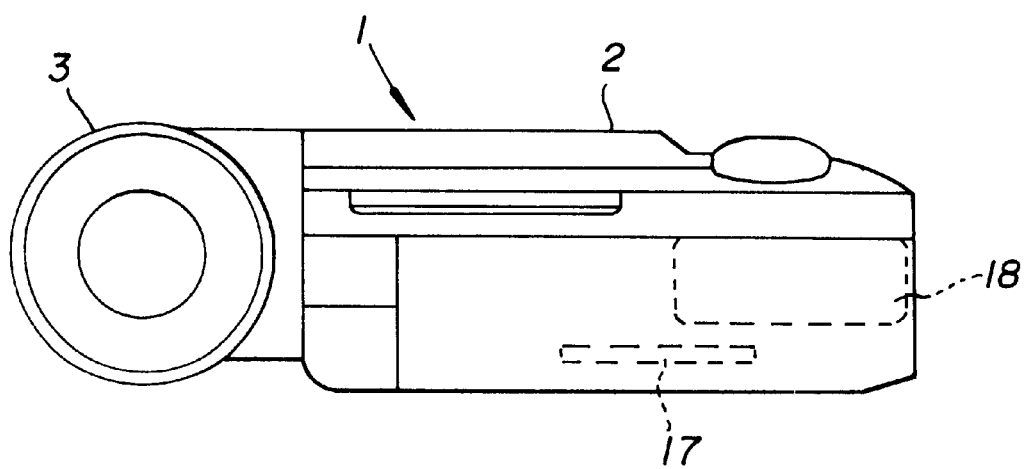
FIG. 3 is a bottom view of the digital camera.

FIGS. 1–3 illustrate a digital camera as a photographing apparatus according to one example of the present invention.

The digital camera 1 comprises a camera frame, which is referred to as a main body 2, and a photographing unit 3 which is attachable to and removable from the main body 2 on the right side of the main body 2 in the front view shown in FIG. 1. The photographing unit 3 is pivotable within a plane parallel to the right side of the main body 2.

The photographing unit 3 has an image pick-up device comprising a zoom lens 301 and a photoelectric conversion device such as a CCD (Charge Coupled Device) array, to convert the optical image of an object into an electric image consisting of charge signals, each of which was generated by each pixel of the CCD via photoelectric conversion. The main body 2 has a display or LCD (Liquid Crystal Display) 10, a slot 17 for receiving a memory card 8, and a connection terminal 13 for connecting the digital camera to the outside apparatus. The image signal taken by the photographing unit 3 is subjected to a prescribed image processing in the main body 2. The processed image is displayed on the LCD display 10, recorded into the memory card 8, or transferred to the PC.

A zoom lens 301 is provided in the photographing unit 3. An image pick-up circuit including a CCD color area sensor 303 is located at an appropriated position behind the zoom lens 301. A light adjusting circuit 304 having a photo sensor 305 for receiving flash light reflected from the object is provided at an appropriated position in the photographing unit 3.

As shown in FIG. 1, a grip 4 is formed in the left-hand side of the front face of the camera main body 2, and a built-in flash device 5 is provided in the right-hand upper side at an appropriate position. Frame forward and backward switches 6 and 7 are provided near the center of the top face of the main body 2 as shown in FIG. 2. The forward switch 6 feeds the frame in the direction that the frame number increases in the photographed order, and is referred to as an UP key 6. The backward switch 7 feeds the frame in the direction that the frame number decreases, and is referred to as a DOWN key 7. A delete key D for deleting the images recorded in the memory card 8 is provided on the left of the DOWN key 7, and a shutter button 9 is provided on the right of the UP key 6 in the rear view shown in FIG. 2.

As shown in FIG. 2, an LCD 10 is provided in the middle of the left-hand side of the rear face of the camera main body 2.

The LCD 10 functions as a view finder during photographing, and as a display during the reproduction of the recorded image. A compression rate setting slide switch 12 for switching the compression rate K of the image date to be recorded in the memory card 8 is positioned below the LCD 10. A USB (Universal Serial Bus) connection terminal 13 is positioned on the side face of the main body 2 near the photographing unit 3. A power switch PS is provided on the top of the rear face of the main body 2.

The flash device (which may be abbreviated as FL) of the digital camera 1 has an "automatic flash mode", a "forcible flash mode", and a "flash prohibition mode". In the "automatic flash mode", the built-in flash device 5 automatically emits flash light according to the luminance of the object. In the "forcible flash mode", the built-in flash device 5 forcibly emits flash light regardless of the luminance of the object. In the "flash prohibition mode", light emission of the built-in flash device 5 is prohibited. Every time the user presses the FL mode setting key 11 positioned above the LCD 10 on the rear face of the main body 2, the flash mode is switched among three modes in a cyclic order. The digital camera 1 has a $\frac{1}{8}$ compression rate and a $\frac{1}{20}$ compression rate, and the user can select the preferred compression rate K. For example, if the compression rate setting switch 12 is shifted to the right, the compression rate K is set to $\frac{1}{8}$, and if it is shifted to the left, the compression rate K is set to $\frac{1}{20}$. Although, in this embodiment, the compression rate K is set to two values, it may be set to three or more values.

A photographing/reproduction mode setting switch 14 is positioned at the top right of the rear face of the main body 2. Digital pictures are taken in the photographing mode. In the reproduction mode, the digital images recorded in the memory card 8 are reproduced and displayed on the LCD 10. The photographing/reproduction mode setting switch 14 is also a bicontact slide switch. For example, if the switch is shifted to the right, the reproduction mode is selected, and if shifted to the left, the photographing mode is selected.

A card insertion slit 17 for receiving the memory card 8 and a battery cavity 18 are positioned on the bottom face of the main body 2. The slit 17 and the battery cavity 18 are covered with a clam-shell type cover 15. The digital camera 1 is loaded with a power supply source E consisting of four AA batteries connected in series.

Figure 4:
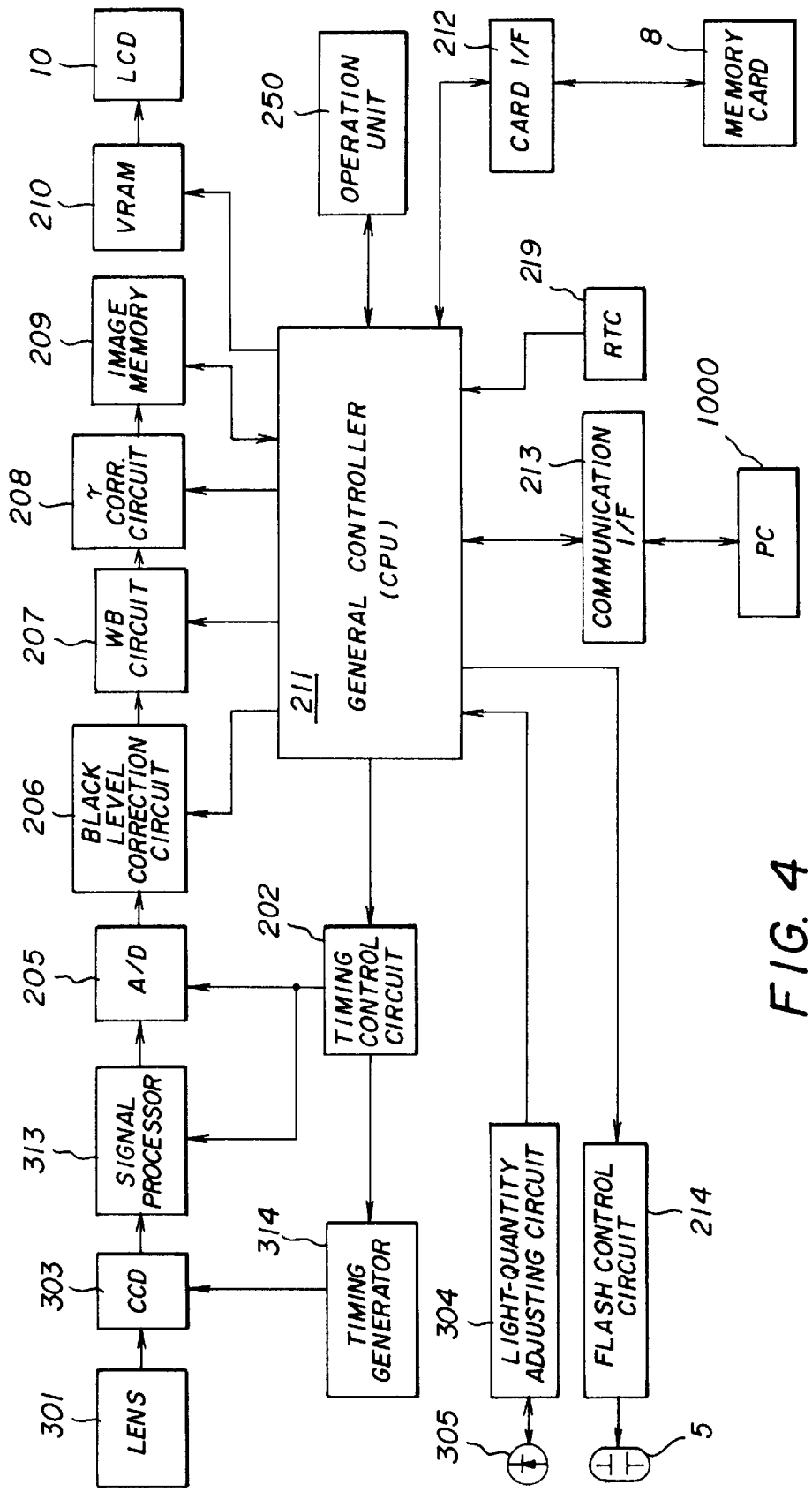
FIG. 4 is a block diagram showing the electrical structure of the digital camera.

FIG. 4 is a block diagram of the control system of the digital camera 1.

The CCD 303 in the photographing unit 3 photoelectrically converts the optical image of the object focussed by the zoom lens 301 into image signals of three color components R (red), G (green) and B (blue), and outputs the image signals to the signal processor 313. This image signal consists of sequence of pixel signals received by the respective pixels. A timing generator 314 generates various timing pulses for controlling and driving the CCD 303.

Since the diaphragm of the photographing unit 3 is fixed, the exposure of the photographing unit 3 is controlled by adjusting the quantity of exposure of the CCD 303, that is, the charge accumulation time of the CCD 303, which correspond to the shutter speed. If the luminance of the object is too low to select to an appropriate shutter speed, the level of the image signal output from the CCD 303 is adjusted in order to compensate for the insufficient exposure. In other words, at a low luminance, the exposure is controlled by adjusting both the shutter speed and the gain. The level of the image signal is adjusted by controlling the gain of the AGC circuit in the signal processor 313.

The timing generator 314 generates various driving control signals for the CCD 303 based on the reference clock supplied from the timing control circuit 202. The signals generated by the timing generator 314 includes a timing signal for starting and finishing integration (i.e., exposure), and clock signals (horizontal synchronization signals, vertical synchronization signals, transfer signals, etc.) for controlling the reading timing of the light-receiving signals from the respective pixels. These timing signals are supplied to the CCD 303.

The signal processor 313 applies prescribed analogue signal processing to the analog image signal output from the CCD 303. The signal processor 313 has a CDS (correlation double sampling) circuit for reducing the noise of the image signal and an AGC (automatic gain control) circuit for adjusting the level of the image signal by controlling the gain of this AGC circuit.

The light-quantity adjusting circuit 304 controls the light emission of the built-in flash device 5 to a predetermined level determined by the general controller 211 when the flash device is used during the photographing. During the flash photographing, the flash light reflected from the object is received by the photo sensor 305 upon starting exposure. When the quantity of light received by the sensor 305 reaches a predetermined level, the light-quantity adjusting circuit 304 supplies a flash stop signal to the flash control circuit 214 via the general controller 211. In response to the flash stop signal, the flash control circuit 214 stops the light emission of the built-in flash device 5, whereby the light emission amount of the built-in flash device 5 can be regulated to the prescribed level.

The A/D converter 205 provided in the main body 2 of the digital camera 1 converts each pixel signal (i.e., analog signal) of the image signal sequence into a 10-bit digital signal based on the A/D conversion clock supplied from the A/D clock generator (not shown).

A reference clock/timing generator 314 and a timing control circuit 202 are also provided in the main body 2. The timing control circuit 202 is controlled by the general controller 211, and generates a clock for the A/D converter 205.

A black level correction circuit 206 corrects the black level of the digitalized pixel signal (hereinafter referred to as pixel data) converted by the A/D converter 205 to the reference black level. A white balance circuit (hereinafter referred to as WB circuit) 207 converts the level of the pixel data of each color component of R, G or B, so that the white balance can be adjusted after γ (gamma) correction. The WB circuit 207 converts the level of the pixel data of each color component R, G, B using a level conversion table input from the general controller 211. The conversion coefficient (or the slope of the characteristic line) for each color component in the level conversion table is set each photographed image by the general controller 211.

The γ correction circuit 208 corrects for the γ characteristic of the pixel data. The γ correction circuit 208 has, for example, six γ correction tables with different γ characteristics, and uses the most appropriate γ correction table according to the photographed scene or the photographic conditions.

An image memory 209 stores the pixel data output from the γ correction circuit 208. The memory capacity of the image memory 209 corresponds to one frame data. Accordingly, if the CCD 303 has an n×m pixel matrix, the image memory 209 has a memory capacity of n×m pixel data, and each pixel data is stored in the corresponding pixel position in the memory.

A VRAM 210 is a buffer memory for storing the image data which is to be reproduced and displayed on the LCD 10. The VRAM 210 has a memory capacity corresponding to the number of pixels to be photographed by the CCD 10.

In the photographing preparation mode, each pixel data of the image taken by the photographing unit 3 every 1/30 seconds is subjected to the prescribed signal processing by the sequence from the A/D converter 205 to the γ correction circuit 208, and stored in the image memory 209. This pixel data is simultaneously transferred to the VRAM 210 via the general controller 211, and displayed on the LCD 10. The user can see the photographed object on the LCD 10.

In the reproduction mode, the image read out from the memory card 8 is subjected to the prescribed signal processing by the general controller 211, which is then transferred to the VRAM 210, and displayed on the LCD 10.

A card I/F 212 is an interface for writing and reading image data into and from the memory card 8. A communication I/F 213 is an interface based on, for example, the USB standard, or an interface for communication for externally connecting the PC 1000.

A flash control circuit 214 controls light emission of the built-in flash device 5. In particular, the flash control circuit 214 controls the quantity of flash light, flash timing, and so on, based on the control signal supplied from the general controller 211. The flash control circuit 214 also brings the light emission to zero based on the flash stop signal STP input from the light-quantity adjusting circuit 304.

An RTC (Real Time Clock) 219 is a time circuit for keeping the track of the date and time of each photograph, which is driven by a separate power source (not shown).

An operation unit 250 is an I/F for the general controller 211 and includes the UP key 6, the DOWN key 7, the shutter button 7, the FL mode setting key 11, the compression rate setting key 12, and the photographing/reproduction mode setting switch 14 and the like.

The general controller 211 is composed of a microcomputer, and it organically controls the driving timing of each element in the photographing unit 3 and the main body 2 so as to generally control the photographing operation of the digital camera 1. Further, as will be explained later, installed in the general controller 211 is a program which executes a predetermined process or controls the data transmitting or receiving when the digital camera 1 is connected to the PC. This program may be installed in the digital camera by a recording medium such an optical disk or a floppy disk, in which this program is recorded.

If, in the photographing mode, the shutter button 9 is pressed to start photographing, the general controller 211 creates tag information (such as the frame number, exposure value, shutter speed, compression rate K, photographing date and time, flash ON/OFF data, scene information, image determination result, etc), store the tag information in the memory card 8 which is an image recording medium detachably installed in the digital camera, together with the thumbnail image created from the image taken in the image memory 209 after the start of the photographing operation, and the compressed image created by a JPEG method at a predetermined compression rate K.

The memory card 8 can store 40 (forty) frames of images taken by the digital camera 1 at a compression rate of 1/20. Each of the frames has tag information, high-resolution image data (640×480 pixels) compressed by a JPEG method, and thumbnail image data (80×60 pixels). Each frame may be treated as an image file of, for example, an EXIF format.

Figure 5:
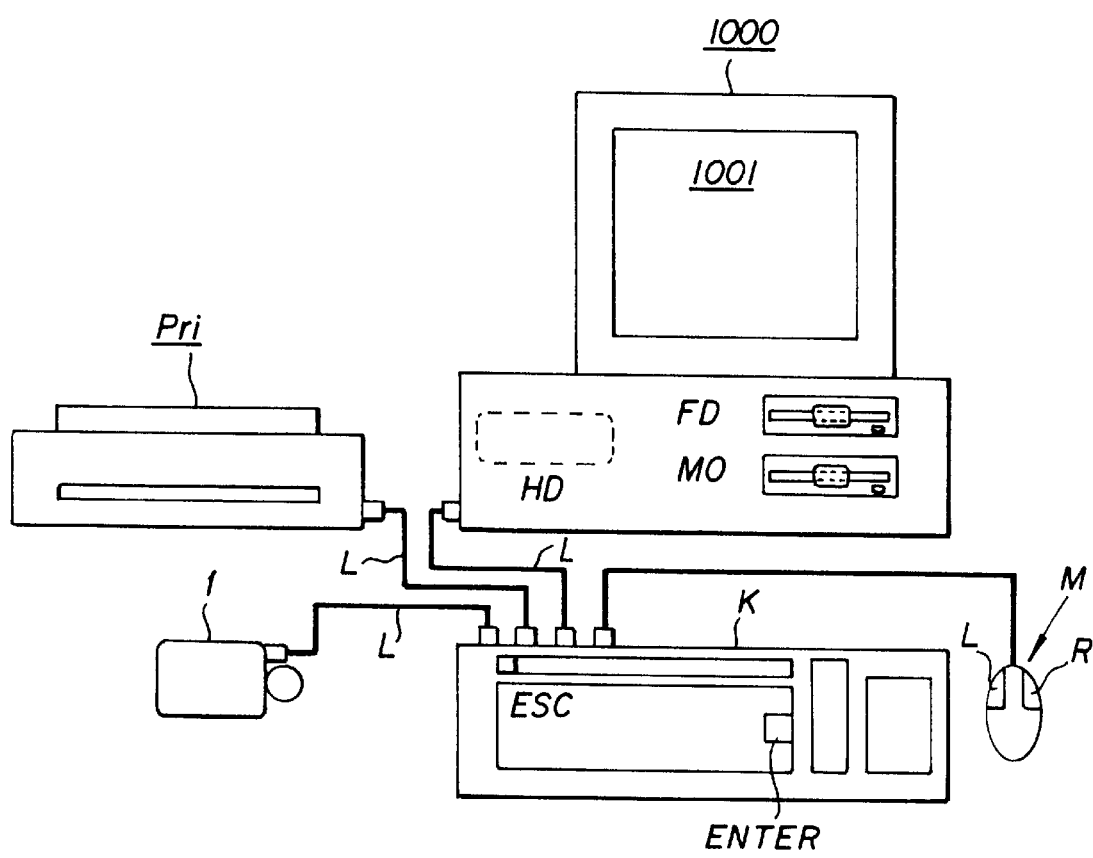
FIG. 5 illustrates a whole structure of an image processing system including the digital camera.

FIG. 5 illustrates the image processing system using the digital camera 1.

This system includes a personal computer (PC) 1000, which functions as an image processing apparatus. A Keyboard K having a return key (Enter) and an escape key (ESC) are connected to the main body of the PC 1000 via a USB cable L. A mouses M, a printer (Pri), and the digital camera 1 are connected to the keyboard (K) via the corresponding USB cables (L). The PC 1000 is able to be activated via a USB interface. The keyboard K also functions as a hub of a USB interface. The PC 1000 has a hard disk HD as a first recording means, in which an operating system and application programs of the PC 1000 are installed. A floppy disk drive FD and an optical magnetic disk drive MO are provided in the PC 1000 so that a floppy disk FD and an optical magnetic disk MO, which are removable recording medium, can be used in the PC 1000. A digital camera connecting application (driver software) is installed in the hard disk HD of the PC 1000 in advance. In FIG. 5, the reference numeral 1001 denotes a display of the display device of the PC 1000.

Figure 8:
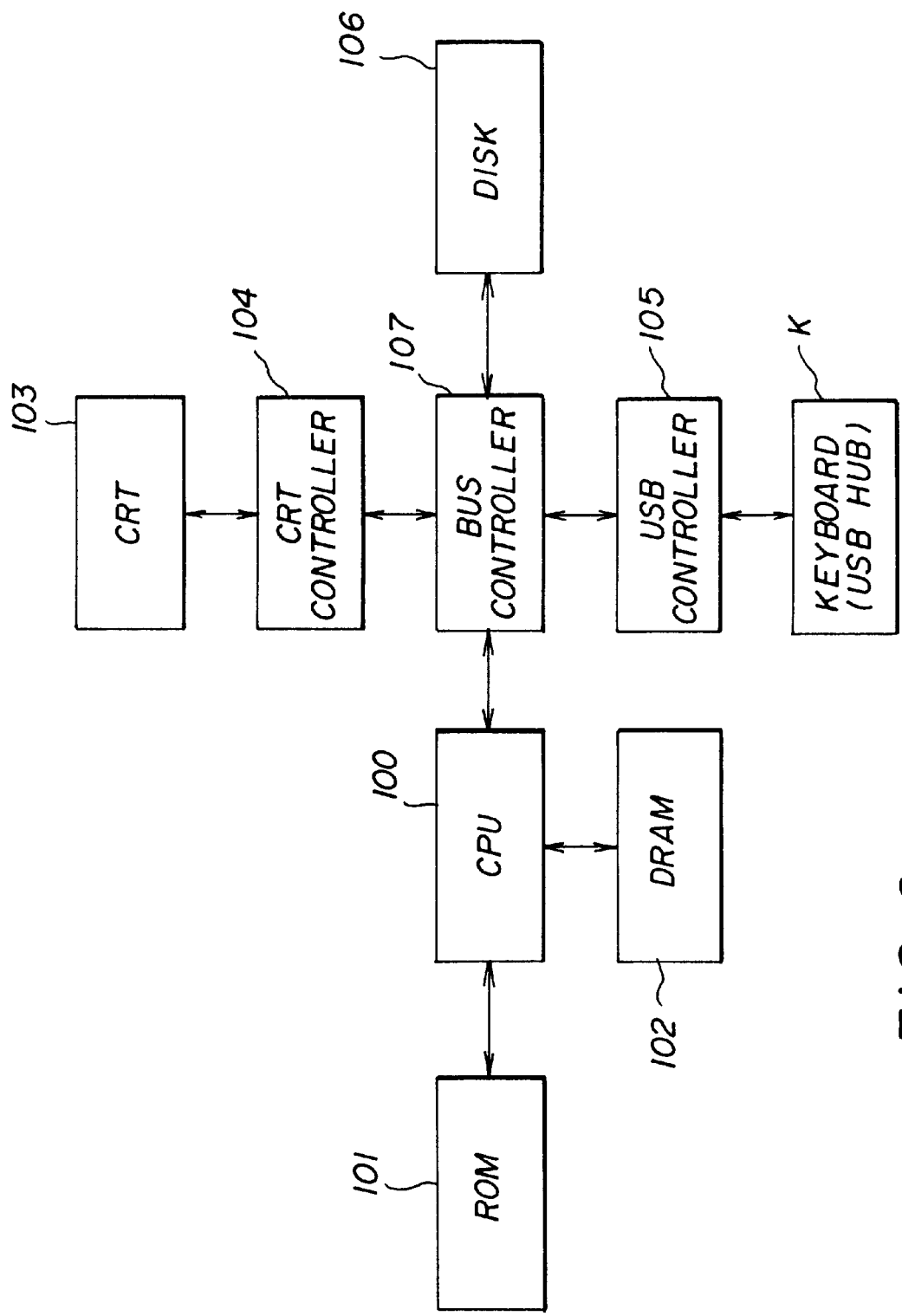
FIG. 8 is a block diagram showing the inside of the PC.

FIG. 8 illustrate a block diagram showing the inside of the PC.

The CPU 100 controls the whole PC. A software for controlling the whole PC is installed in the ROM 101. The DRAM 102 is used to process an image signal input from the digital camera 1. The CRT 103 corresponds to the display 1001 of the display device and is controlled by the CRT CONTROLLER 104. The USB CONTROLLER 105 controls the USB connection between the keyboard K and the main body of the PC. The DISK 106 includes a recording medium and a driver software for driving the recording medium. In the DISK 106, a driver software for taking an image into the DISK from the digital camera 1 is installed. The DISK 106 records the image photographed by the digital camera 1.

The CPU 100, the CRT CONTROLLER 104, the USB CONTROLLER 105 and the DISK 106 exchange data with each other via the BUS CONTROLLER 107.

Figure 6B:
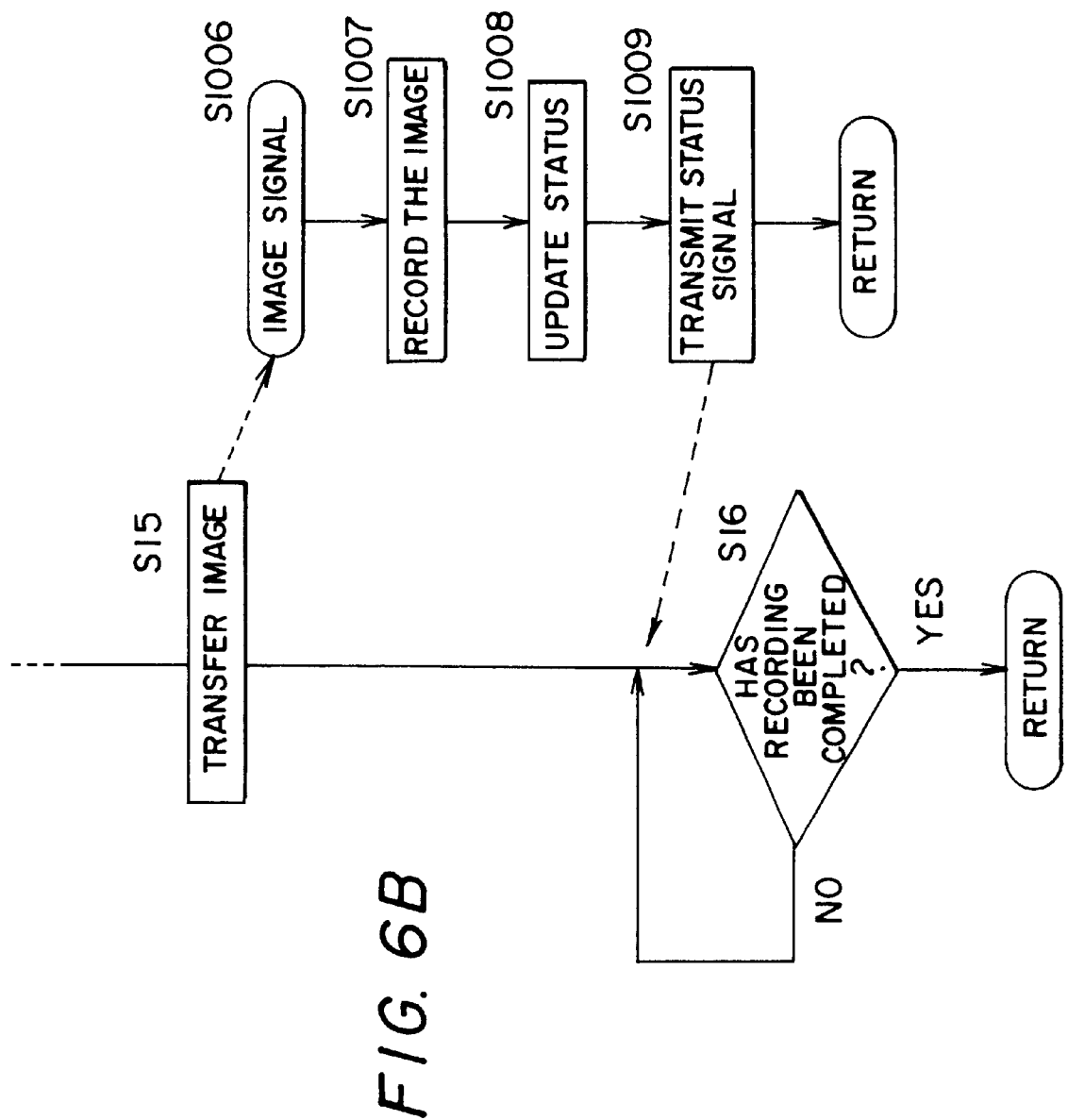
FIG. 6 is a flowchart showing an image recording process of the photographed images in the system shown in FIG. 5.
Figure 7B:
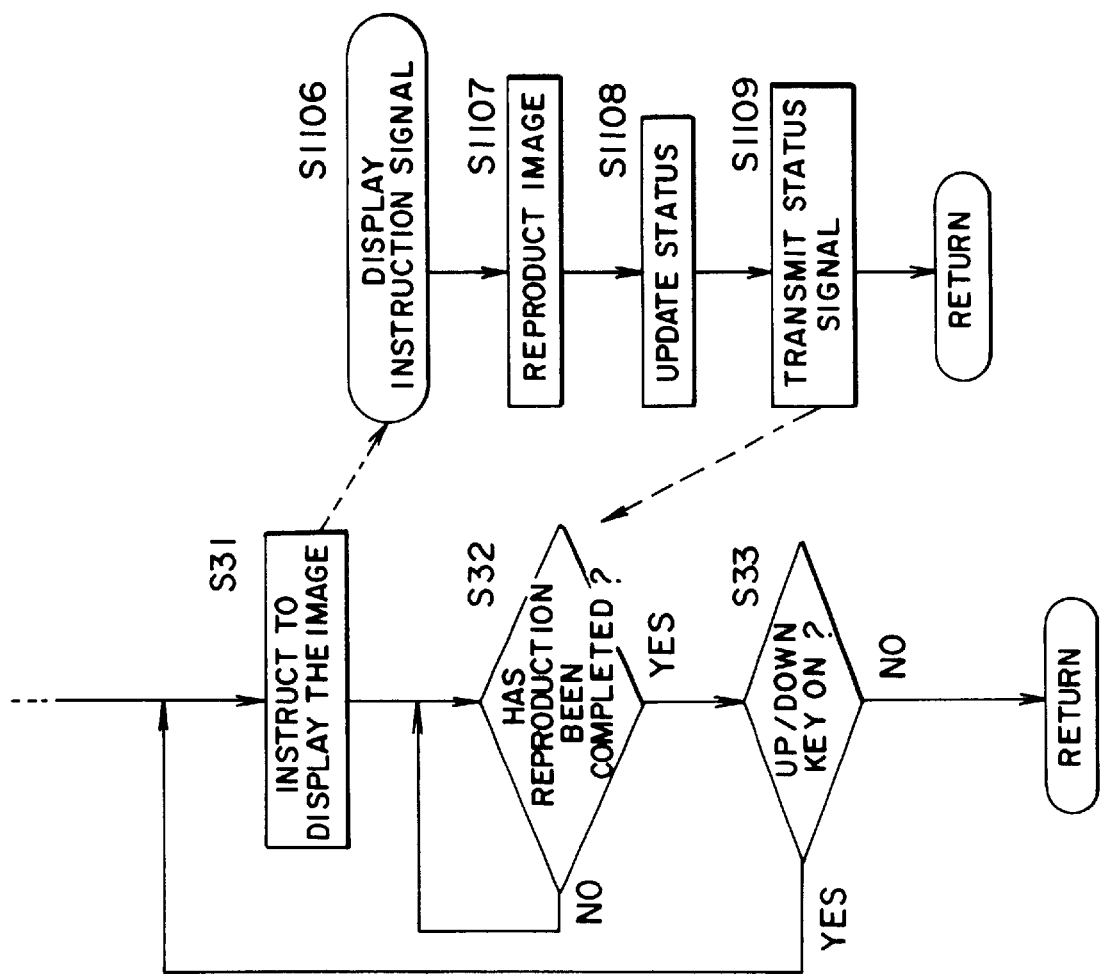
FIG. 7 is a flowchart showing an image reproducing process of the photographed images in the system shown in FIG. 5.

The recording process of the photographed image in the image processing system shown in FIG. 5 will be explained with reference to the flowchart shown in FIG. 6. In FIG. 6 and FIG. 7 which will be explained later, the personal computer will be referred to as "PC", and the step will be simply referred to as "S".

When the digital camera 1 is in a photographing mode, in S1 and S2, it is detected if there is a memory card 8 in the card insertion slot 17. If there is (YES in S2), the remained capacity of the memory card 8 is detected in S3.

Next, in S4, it is determined if it is possible to record the photographed image based on the detected capacity. If possible (YES in S4), in S5, it is determined if the shutter button is pressed as if in a normal photographing operation of the digital camera. If pressed (YES in S5), the photographing and the signal processing processes are performed in S6 and S7, respectively. Then, the image is recorded in the memory card 8 and is displayed on the display 10 in S9. In this way, in a case where the memory card 8 is installed in the digital camera 1 and it is possible to record the photographed image, the image is recorded in the memory card 8. If the shutter button is not pressed (NO in S5), this process terminates.

On the other hand, as a result of the determination in S2, if it is detected that the memory card 8 is not inserted in the slot 17 (NO in S2) or it is not possible to record the image because of an insufficient remaining capacity of the memory card 8 even if the card is inserted in the slot (NO in S4), the PC is called in S10.

If the digital camera 1 and the PC 1000 are connected to each other, the PC 1000 executes a communication process in S1000 in response to the call from the digital camera 1. First, in S1001, it is determined if the power source of the PC is turned off. If the power source is turned off (YES in S1001), the power source is turned on in S1002 and activates the driver software for the digital camera in S1003. Then, in S1004, the status showing the state of the PC 1000 is updated and the information is transmitted to the digital camera 1 in S1005.

In S11, the digital camera 1 starts photographing when the signal from the PC 1000 is received. However, if the signal is not received (NO in S11), a warning message which shows it is impossible to photograph is displayed on the display 10 in S12, regarded as the PC 1000 is not connected to the digital camera 1 or the PC side is unavailable to record the image due to its busy state. Then, this process terminates.

If the signal is received by the digital camera 1 (YES in S11) and it is possible to record the image, photographing and signal processing are performed in S13 and S14, respectively. Thereafter, in S15, the image data is transmitted to the PC 1000. At the PC 1000 side, when the PC 1000 received the image data in S1006, the photographed image is recorded in the hard disk drive HD in S1007 and the status is updated in S1008. Then, the status signal representing the recording completion is transmitted to the digital camera 1 in S1009. In this case, the image is not displayed at the digital camera side to save the power consumption. After the digital camera 1 received the status signal from the PC 1000, the recording of the photographing image is completed.

As explained above, in a case where the memory card 8 is not installed in the digital camera 1 or the remaining capacity of the memory card 8 is not sufficient, the photographed image is automatically recorded in the hard disk HD of the PC 1000. In other words, the recording destination of the photographed image can be controlled depending on whether or not the memory card 8 is installed in the digital camera 1. The photographed image may be recorded in an optical magnetic disk MO instead of the hard disk HD of the PC 1000.

In the process shown in FIG. 6, it is determined whether or not the memory card 8 is installed in the digital camera 8 and the remaining capacity of the memory card 8 is detected if the memory card 8 is installed in the digital camera 8. However, if the memory card 8 is installed in the digital camera 1, the status may be updated without detecting the remaining capacity of the memory card 8.

A reproducing process of the photographed image in the digital camera system shown in FIG. 5 will be explained with reference to the flowchart shown in FIG. 7.

When the digital camera 1 is in a reproduction mode, in S21 and S22, it is detected if a memory card 8 is inserted in the card insertion slot 17 in the same way as in the recording mode. If the memory card 8 is inserted (YES in S22), the number of photographed frames in the memory card 8 is detected in S23. If there is a recorded image (YES in S24), the updated image is displayed on the display 10 in S25 in the same way as the image is normally reproduced in the digital camera 1. In S27, the displayed image is updated every time the UP/DOWN key is pressed in S26. Therefore, if the memory card 8 is installed in the digital camera 1 and there is a recorded image in the memory card 8, the updated image is automatically displayed on the display 10 and the other image is selectively displayed on the display 10.

On the other hand, as a result of the determination in S22, if it is detected that the memory card 8 is not inserted in the slot 17 (NO in S22) or there is no recorded image in the memory card even if it is installed in the digital camera 1 (NO in S24), the PC 1000 is called in S28.

If the digital camera 1 and the PC 1000 are connected each other, the PC 1000 executes a communication process in S1100 in response to the call from the digital camera 1. First, in S1101, it is determined if the power source of the PC is turned off. If the power source is turned off (YES in S1101), the power source is turned on in S1102 and activates the driver software for the digital camera 1 in S1103. Then, in S1104, the status showing the state of the PC 1000 is updated and the information is transmitted to the digital camera 1 in S1105.

In S29, the digital camera 1 starts reproducing the image when the signal from the PC 1000 is received. However, if the signal is not received (NO in S29), a warning message which shows it is impossible to reproduce the image is displayed on the display 10 in S30, regarded as the PC 1000 is not connected to the digital camera 1 or the PC side is unavailable to reproduce the image due to its busy state. Then, this process terminates. If the signal is received by the digital camera 1 (YES in S29) and it is possible to reproduce the image, an instruction for displaying the updated image is transmitted to the PC 1000 in S31. At the PC 1000 side, when the PC 1000 received the display instruction signal in S1106, the photographed image recorded in the hard disk HD is reproduced in S1107 and the status is updated in S1108. Then, the status signal representing the reproducing completion is transmitted to the digital camera 1 in S1109.

In S32, the digital camera 1 waits for the reproducing of the image to be completed based on the receipt of the status signal from the PC 1000. After the completion (YES in S32), an instruction for updating the displayed image is transmitted to the PC 1000 in S31 every time the UP/DOWN key is pressed in S33. In accordance with the operation of the UP/DOWN key in the digital camera 1, the image in the hard disk is alternatively displayed on the display 1001 of the PC.

As explained above, in a case where the memory card 8 is not installed in the digital camera 1 or no image is recorded in the memory card even if the memory card is installed in the digital camera 1, the photographed image recorded in the hard disk HD is automatically reproduced.

In the above described embodiment, although a memory card and a hard disk HD are explained as a recording medium detachable to the digital camera and a recording medium of the PC side, respectively, this invention is not limited to the above.

In the above embodiment, if it is determined that an image recording medium, which is detachable to the digital camera, is installed in the digital camera, the photographed image is recorded in the recording medium. If it is determined that an image recording medium is not installed in the digital camera, an activation signal is transmitted to the computer from the digital camera. Thus, the recording medium of the PC side activated by the activation signal records the photographed image. As a result, the recording medium for recording the photographed image is determined based on whether or not an image recording medium is installed in the digital camera, not based on whether or not the digital camera is connected to the PC. In other words, the recording destination of the photographed image can be controlled based on whether or not there is an image recording medium in the digital camera. If the user wants to record an image data in a digital camera, what to do for the user is to install a recording medium in the digital camera. If the user wants to record an image data in a PC side, what to do for the user is not to install a recording medium in the digital camera. Thus, the management of the photographed image can easily be performed.

Further, in a case where an image recording medium is not installed in the digital camera, an activation signal is automatically transmitted to the computer from the digital camera to automatically activate the computer. This eliminates a troublesome steps including a physical connection between the digital camera and the PC and an activation of the driver software of the PC, resulting in a simple operation when recording an image to a recording medium of the PC side.

In addition, in a case where it is not possible to record a photographed image to a recording medium despite the recording medium being installed in the digital camera, the image is recorded in a recording medium of the computer side. Therefore, in a case where it is difficult to record a photographed image because of insufficient remaining capacity of the recording medium even if the recording medium is installed in a digital camera, or the similar case, the photographed image is automatically recorded in a recording medium of the computer side, which eliminates mis-recording of a photographed image.

Although the present invention has been described based on the preferred embodiment, the terms and the sentences used in this specification are explanatory, and not limiting the present invention. It should be appreciated that there are many modifications and substitutions without departing from the spirit and scope of the present invention.

What is claimed is:

1. A photographing apparatus which is able to transfer an image to an image processing apparatus with a first recording medium, said image processing apparatus processes an image stored in said first recording medium, the photographing apparatus, comprising:

a discriminator determines a state of a second recording medium for recording a photographed image, said second recording medium being detachably provided to said photographing apparatus;

a selector selects whether the photographed image is to be transferred to the first recording medium or to the second recording medium, based on the determined state by said discriminator; and a controller controls a transfer of the photographed image to the recording medium selected by said selector.

2. The photographing apparatus according to claim 1, wherein said discriminator discriminates whether or not the second recording medium is provided to said photographing apparatus, and wherein said selector selects the first recording medium when the second recording medium is not provided to said photographing apparatus.

3. The photographing apparatus according to claim 1, wherein said discriminator detects a recordable capacity of the second recording medium, and wherein said selector selects the first recording medium when the second recording medium is unable to record the photographed image.

4. The photographing apparatus according to claim 1, further comprising a transmitter which transmits an activation signal for activating the image processing apparatus to the image processing apparatus when the first recording medium is selected by said selector.

5. An image recording method by a photographing apparatus, the method including the steps of:

determining a states of a first recording medium for recording a photographed image, said first recording medium being detachably provided to the photographing apparatus;

selecting whether the photographed image is to be transferred to the first recording medium or to an external apparatus of the photographed apparatus, based on the determined state, said external apparatus is provided with a second recording medium and processes an image stored in said second recording medium; and controlling a transfer of the photographed image based on the selected result.

6. The method according to claim 5, further comprising the step of:

transmitting to the external apparatus an activation signal for activating the external apparatus when the photographed image is selected to be transferred to the external apparatus.

7. A program product on a storage device, said program product executable by an image sensing device, wherein the program product comprising the steps of:

determining a state of a first recording medium for recording a photographed image, said first recording medium being detachably provided to the photographing apparatus;

selecting whether the photographed image is to be transferred to the first recording medium or to an external apparatus of the photographing apparatus, based on the determined state, the external apparatus is provided with a second recording medium and processes an image stored in the second recording medium; and controlling a transfer of the photographed image based on the selected result.

8. A photographing apparatus connectable to an image processing apparatus with a first recording medium, said image processing apparatus processes an image stored in said first recording medium, said photographing apparatus comprising:

a discriminator discriminates a state of a second recording medium which is able to record a plurality of images, said second recording medium being detachably provided to said photographing apparatus;

a selector which selects whether the image recorded in the first recording medium is to be reproduced or the image recorded in the second recording medium is to be reproduced, based on the discriminated state by said discriminator; and a controller which controls a reproduction of the image from the recording medium selected by said selector.

9. The photographing apparatus according to claim 8, wherein said discriminator discriminates whether or not the second recording medium is provided to said photographing apparatus, and wherein said selector selects the first recording medium when the second recording medium is not provided to said photographing apparatus.

10. The photographing apparatus according to claim 8, wherein said discriminator discriminates the number of images recorded in the second recording medium, and wherein said selector selects the first recording medium when no image is recorded in the second recording medium.

11. The photographing apparatus according to claim 8, further comprising a transmitter which transmits to the image processing apparatus an activation signal for activating the image processing apparatus when the first recording medium is selected by said selector.

12. An image reproducing method by a photographing apparatus, the method including the steps of:

discriminating a state of a first recording medium which is able to record a plurality of images, said first recording medium being detachably provided to the photographing apparatus;

selecting whether the image recorded in the first recording medium is to be reproduced or the image recorded in an external apparatus of the photographing apparatus is to be reproduced, based on the discriminated state, said external apparatus is provided with a second recording medium and processes an image stored in said second recording medium; and controlling a reproduction of the image based on the selected result.

13. The method according to claim 12, further comprising the step of:

transmitting to the external apparatus an activation signal for activating the external apparatus to the external apparatus when a reproduction of image recorded in the external apparatus is selected.

14. A program product on a storage device, the program product executable by an image sensing device, wherein the program product comprises the steps of:

discriminating a state of a first recording medium which is able to record a plurality of images, said first recording medium being detachably provided to the photographing apparatus;

selecting whether the image recorded in the first recording medium is to be reproduced or the image recorded in an external apparatus of the photographing apparatus is to be reproduced, based on the discriminated state, the external apparatus is provided with a second recording medium and processes an image stored in the second recording medium; and controlling a reproduction of the image based on the selected result.

* * * * *

UNITED STATES PATENT AND TRADEMARK OFFICE
CERTIFICATE OF CORRECTION

PATENT NO. : 6,297,870 B1
DATED : October 2, 2001
INVENTOR(S) : Katsuyuki Nanba

It is certified that error appears in the above-identified patent and that said Letters Patent is hereby corrected as shown below:

<u>Claim 13,</u>
At the end of line 4 and the beginning of line 5, the words "to the external apparatus" are deleted.

Signed and Sealed this

Fourteenth Day of May, 2002

*Attest:*

*Attesting Officer*

JAMES E. ROGAN
*Director of the United States Patent and Trademark Office*